Patented Jan. 8, 1935

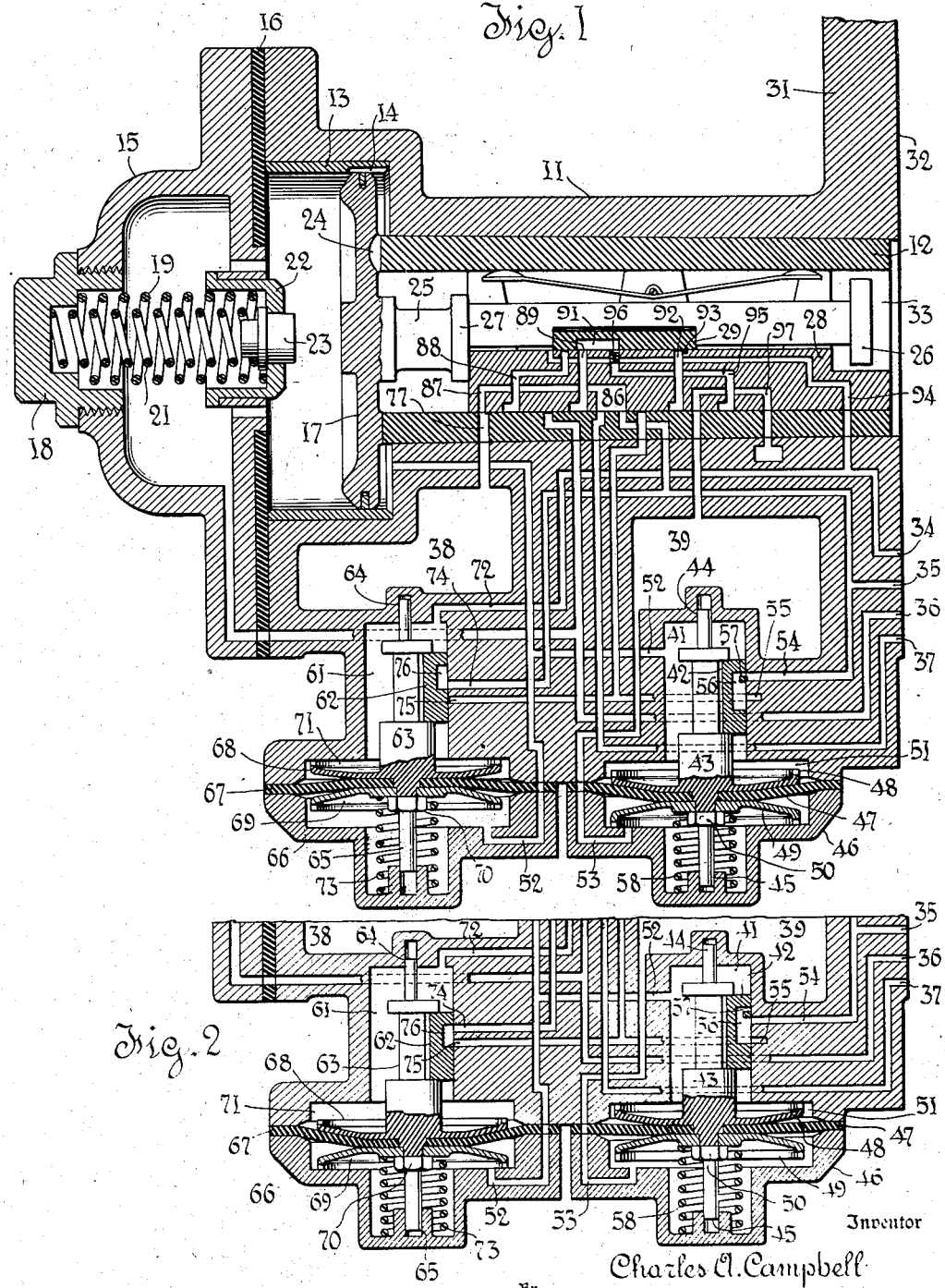

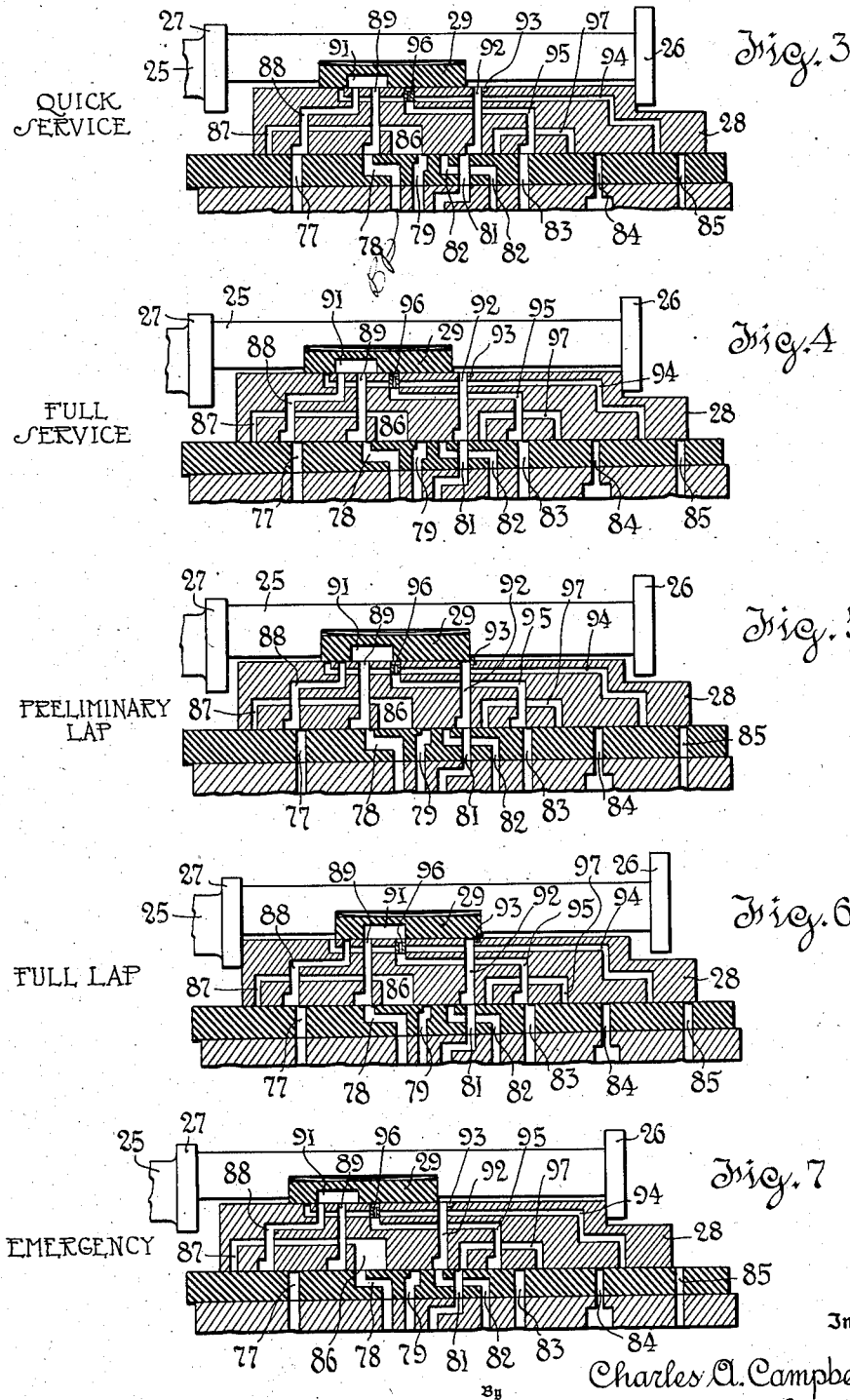

1,986,916

UNITED STATES PATENT OFFICE 1,986,916

AIR BRAKE

Charles A. Campbell, Watertown, N. Y., assignor to The New York Air Brake Company, a corporation of New Jersey Application June 9, 1932, Serial No. 616,326

30 Claims. (Cl. 303—87)

This invention relates to air brakes and particularly to means for neutralizing the harmful effects of pressure gradient in the brake pipe. This gradient is occasioned by brake pipe leakage, and in service applications causes the brakes on the forward end of the train to apply more severely. Severe slack action and damage to cars and lading often result.

On a long brake pipe, when the engineer's brake valve is in running position, and the feed valve is functioning, leakage produces a falling pressure gradient sometimes so pronounced that brake pipe pressure at the rear end is as much as 15 pounds per square inch lower than brake pipe pressure at the locomotive. It follows that the charges in the auxiliary reservoirs vary similarly.

In making a service application the engineer moves his brake valve to service position until the desired reduction is secured in the equalizing reservoir and then places the brake valve in lap. The brake pipe pressure reduction thus initiated runs through the brake pipe, being maintained and accelerated by local quick service venting, until it reaches the end of the train. The feed valve is out of action, the equalizing discharge valve has only limited capacity, the quick service vents have lowered pressure by a more or less uniform amount to the end of the train. Hence brake pipe pressure is higher at the front end and flow starts immediately toward the rear. Finally pressure in the brake pipe levels off.

Since triple valves move to lap position under the differential between auxiliary reservoir pressure and brake pipe pressure without regard to brake cylinder pressure, and since the rear reservoirs have lower initial charges, the triple valves at the rear of the train will lap first, those at the front feeding air to the cylinders over a longer period from fully charged reservoirs. Hence the front brakes apply more heavily.

Pressure surges in the brake pipe tend to cause valves to move through lap to release, and then reapply, with obviously harmful effects.

The present invention contemplates the use of a stabilizing chamber associated with and controlled by a triple valve, in such manner that the stabilizing chamber is vented in release and remains uncharged when the triple valve moves initially to service position.

When the valve starts to lap position the stabilizing chamber is opened to brake pipe and absorbs pressure fluid therefrom. This inherently checks the lapping motion and prevents overtravel. If lapping is caused by a pressure surge the chamber absorbs the crest of the pressure wave and the serial action of a few chambers will dissipate the wave's energy.

According to a further refinement of the invention a pressure shifted delay valve is used to retard flow from the auxiliary reservoir through the triple valve to the brake cylinder when the surge chamber is uncharged, and permit free flow when the chamber is charged. From this it follows that service flow is delayed until the triple valves have once lapped and is free thereafter. Useful effects are secured by opposing stabilizing chamber pressure to auxiliary reservoir pressure in controlling such delay valve.

On short trains an engineer sometimes makes a continuous service reduction in which the triple valves do not lap. In such case continuous restriction of flow to the brake cylinder would unduly delay the development of brake cylinder pressure. To avoid this, the invention further contemplates means to terminate the restriction of flow to the cylinders when auxiliary reservoir pressure has been reduced a definite amount. A valve controlled by auxiliary reservoir pressure opens a by-pass around the delay valve when reservoir pressure has fallen a definite amount. The by-pass valve is controlled by auxiliary reservoir pressure in opposition to pressure fluid trapped in a volume which is charged concurrently with the auxiliary reservoir. This volume may, if desired, conveniently be a supplemental reservoir, not drawn on in service, but used for furnishing extra air in emergency.

An embodiment of the invention disclosing all the features above mentioned is illustrated in the accompanying drawings, in which,—

Fig. 1 is a vertical axial section through the triple valve showing the triple valve in release position, the delay valve in delay position and the bypass valve in closed position.

Fig. 2 is a fragmentary view similar to a portion of Fig. 1, and showing the delay valve in free flow position and the bypass valve in open position.

Fig. 3 is a fragmentary view of the slide valve together with its seat and graduating valve, the parts being shown in quick service position, in which position the service port is partially open and the quick service ports fully opened.

Fig. 4 is a similar view showing the parts in full service position in which the quick service ports remain partially open and the service port is fully opened.

Fig. 5 is a similar view showing the parts in preliminary lap position.

Fig. 6 is a similar view showing the parts in full lap position.

Fig. 7 is a similar view showing the parts in emergency position.

Referring first to Fig. 1, the body of the triple valve is indicated at 11 and is provided with the usual slide valve chamber bushing 12 which is formed with the usual slide valve seat. The cylinder bushing 13 is formed with a charging groove 14. The front cap 15 is sealed to the body 11 by means of the gasket 16, the gasket 16 serving in emergency position as a seat for the rim of the triple piston 17 as usual. The front cap 15 carries a plug 18 which serves as a spring seat for two concentric coil compression springs 19 and 21. The outer and heavier spring 19 reacts against a cup-like sliding stop 22, and the inner spring 21 reacts against a plunger stop 23 slidable in the cup-like stop 22. The parts are so arranged that when the piston engages the stop 23 without compressing spring 21, the parts are in quick service position of Fig. 3. When the piston 17 overpowers spring 21 and engages stop 22 without compressing spring 19, the parts are in full service position of Fig. 4. When both springs are overpowered the piston moves to emergency position of Fig. 7.

When auxiliary reservoir pressure falls to approximately equalization with brake pipe pressure, the spring 21, acting through stop 23, shifts the piston 17 to move the parts toward lap position, but the stop 23 ceases to act when the parts reach the preliminary lap position of Fig. 5, so that motion from preliminary lap position, Fig. 5, to full lap position, Fig. 6, is dependent on pressure differential between the brake pipe and auxiliary reservoir.

When the piston 17 is in its release position, Fig. 1, it seats against the end of the valve chamber bushing 12 as shown, and charging flow occurs through the groove 24. In order to simplify the illustration no attempt has been made to illustrate either restricted release or recharge. There is nothing inherent in the present invention to exclude the use of restricted release and recharge, if desired. The arrangement for accomplishing this result might follow conventional methods well known to those skilled in the art.

The piston 17 is provided with a stem 25 which is guided at its inner end by the usual spider 26. Between the spider 26 and a collar 27 a slide valve 28 is confined, a moderate amount of lost motion being permitted. The graduating valve 29 is closely confined in a notch in the stem 25 and this moves relatively to the valve 28 as an incident to the lost motion allowed to the slide valve. The slide valve and graduating valve are held to their seats by the usual bow-springs, shown in the drawings.

The triple valve 12 is illustrated as of the well known pipeless type having a mounting flange 31 and mounting face 32 which is intended to coact with a support to which appropriate connections are made, and provided with ports which register with corresponding ports of the triple valve, as usual. As such mechanism is well known, it is not necessary to illustrate the support. There are connections as follows:

33 leads directly from the space within the slide valve chamber to the auxiliary reservoir. 34 is a supplemental reservoir passage. 35 is the brake cylinder passage. 36 is the brake pipe passage and 37 is the brake cylinder exhaust passage, which may be controlled by a retainer, not shown.

Formed in the body 11 are two chambers, a quick service chamber 38 and a stabilizing chamber 39. Adjacent the stabilizing chamber 39, but out of communication therewith, is the valve chamber 41 for the delay valve 42. The delay valve 42 is of the slide type, and is confined in a notch in the longitudinally reciprocating stem 43 which is guided by reduced extensions 44 and 45 which work in guideways formed respectively in the body 11 and a cap 46. The cap 46 clamps a flexible diaphragm 47 at its periphery, and this diaphragm is connected at its center to the stem 43. The stem 43 carries an integral disk 48 and a removable clamping disk 49, which are essentially similar and which present convex surfaces to the diaphragm 47. The disks are notched at their periphery to permit the free passage of air, the disks serving as limit stops. They are clamped by nut 50.

The chamber 51 above the diaphragm 47 is in direct communication with the slide valve chamber 41, and this is connected by the passage 52 with the interior of the slide valve chamber 33, and consequently with the auxiliary reservoir. The space below the diaphragm 47 within the cap 46 is connected by the passage 53 with the stabilizing chamber 39.

There are two ports 54 and 55 in the seat for the slide valve 42 and the slide valve is formed with a cavity 56 and a slender extension 57 leading therefrom. A coil spring 58 urges the stem 43 upward toward that position in which the cavity 56 freely connects the ports 54 and 55. When the spring 58 is overpowered the extension 57 maintains a restricted communication between the ports 54 and 55.

The diaphragm actuated valve mechanism just described is known as the delay valve. There is a closely similar mechanism known as the secondary admission valve and serving to offer a free bypass around the constriction established by the delay valve under certain conditions. The secondary admission valve comprises a slide valve chamber 61 having a seat for the bypass slide valve 62. This valve is confined closely in a notch in the stem 63 and the stem 63 is guided at 64 in the body 11 and at 65 in the cap 66. The cap 66 serves to clamp the flexible diaphragm 67 at the marginal portions of the diaphragm, and this diaphragm is clamped between two convex disks, of which one, 68, is integral with the stem 63, and of which the other, 69, is removably mounted on an extension of the stem 63 and clamped in position by a nut 70.

The chamber 71, above the diaphragm 67, communicates directly with the slide valve chamber 61 and this in turn is connected by a passage 72 with the supplemental reservoir connection 34. The space within the cap 66 below the diaphragm 67 is connected with the passage 52, already described, and consequently is at auxiliary reservoir pressure. The diaphragm 67 is urged upward by a compression spring 73.

In the seat for the slide valve 62 are two ports 74 and 75 and the slide valve 62 is formed with a cavity 76, which in the lower position of the slide valve bridges the ports 74 and 75. In the upper position of the slide valve these ports are disconnected. The disks 68 and 69 serve as limit stops to control the motion of the stem 63 and slide valve 62.

The porting of the triple slide valve seat can now be described.

The quick service measuring chamber seat port 77 leads to the quick service chamber 38. The brake pipe quick service seat port 78 leads to the brake pipe connection 36 which, as usual, communicates with a space to the left of the triple piston 17. The brake cylinder exhaust port 79 leads directly to the exhaust connection 37. A service port 81 leads to the ports 55 and 75 in the seats of the delay valve 42 and bypass valve 62 respectively. The brake cylinder port 82, which functions in emergency and release to afford unrestricted brake cylinder flow, communicates directly with the brake cylinder connection 35. The brake cylinder connection 35 is also directly connected with the ports 54 and 74 which respectively are in the seats for the delay valve 42 and bypass valve 62.

The stabilizing chamber port 83 leads directly to the stabilizing chamber 39. The independent exhaust port 84 leads directly to atmosphere and is not controlled by the retainer. Its sole function is to exhaust the stabilizing chamber in release position.

Supplemental reservoir port 85 leads directly to the supplemental reservoir connection 34, which, as already explained, is connected with the valve chamber 61 and hence functions to hold the slide valve 62 to its seat and also to urge the diaphragm 67 downward. The slide valve 28 is provided with an exhaust cavity 86 which in release position connects the brake cylinder port 82 with the exhaust port 79. An extension 87 serves in release position to connect the quick service chamber port 77 with the exhaust passage 79. The ports 86 and 87 have no other functions.

There are two through ports 88 and 89 which extend from top to bottom of the slide valve 28 and which are connected at their upper end by cavity 91 in the graduating valve 29 when the latter is in its outer (left hand) position relatively to the slide valve. See Figs. 3 and 4. Ports 88 and 89 are slightly enlarged on the lower face of the slide valve 28. They function in quick service position (Fig. 3) in conjunction with cavity 91, to connect ports 77 and 78 fully. They function in full service position (Fig. 4) in conjunction with cavity 91 to offer a restricted communication between ports 77 and 78. Thus as the valve starts to service there is a rapid venting into the chamber 38 and before equalization occurs continued motion of the triple valve toward full service position restricts the flow and offers a gradual termination of quick service venting.

There is an application port 92 which extends through the valve 28 from top to bottom and which is formed with an extension at its lower end so that it starts to register with the port 81 in quick service position and reaches full register therewith in full service position.

Since the port 81 leads to the seats of the slide valves 42 and 62 service flow is controlled by the action of these two valves. In emergency position the port 92 registers with the brake cylinder port 82 which permits direct flow to the brake cylinder. At that time the valve 28 exposes the supplemental reservoir port 85 so that in emergency both reservoirs furnish air to the brake cylinder.

At the upper end of the port 92 is a minute extension 93 which remains open when the graduating valve 29 is shifted to preliminary lap position (Fig. 5). At this position the graduating spring 21 ceases to act so that the final motion from preliminary lap to lap position results from a gradual bleeding down of auxiliary reservoir pressure by flow to the brake cylinder until a sufficient pressure differential is developed on the triple piston to complete the lapping motion. The extension 93 and its special functions are broadly claimed in prior applications Serial No. 593,635, filed February 17, 1932, and Serial No. 592,642, filed February 12, 1932, and hence are here claimed only in special combinations.

The use of such service extension port, producing a characteristic preliminary lap position, is claimed in the present application only in connection with the stabilizing chamber.

There is a port 94 which extends through the valve 28 from top to bottom and is controlled by the outer end of the graduating valve 29. In release position (Fig. 1) port 94 registers with port 85 in the seat and is exposed at its upper end by the graduating valve, thus connecting the two reservoirs so that the supplemental reservoir may assist in charging the auxiliary reservoir after service application, and so that the two reservoirs may be concurrently charged after such equalization or in release following an emergency application.

There is a through port 95 extending from top to bottom of the slide valve 28 and provided with a restriction or choke 96 which limits the flow through the port to a relatively small rate. This port in preliminary lap and lap positions is in partial register with the seat port 83 which leads to the stabilizing chamber 39, and at such times the upper end of the port is connected by cavity 91 to port 89 which is then in communication with the brake pipe seat port 78. Consequently in preliminary lap and full lap positions, brake pipe air is bled into the stabilizing chamber at a restricted rate, so chosen by the dimensioning of the choke 96 as to check the rise of brake pipe pressure and delay the lapping movement of the valve. The idea is to slow down the lapping movement, thus reducing the tendency to overtravel. The port is preferably so dimensioned that the lapping movement will not be arrested. The effect is to dissipate the crest of pressure wave in the brake pipe and absorb the wave energy, thus minimizing the pressure waves in the brake pipe which would tend to cause valves to move beyond lap position and then return to application position.

There is a loop port 97 in the slide valve 28 and the sole function of this port is to connect the stabilizing chamber port 83 with the independent exhaust port 84 when the triple valve is in release position.

It follows that the stabilizing chamber 39 is vented in release position and only in release position. When the triple valve moves to quick service and service positions the stabilizing chamber receives no charge. Consequently, the space below the diaphragm 47 remains at atmospheric pressure and auxiliary reservoir pressure, acting downward on the diaphragm 47, overpowers spring 58 and holds valve 42 in position to restrict service flow to the brake cylinder. At the same time the diaphragm 67 is subject on its upper side to supplemental reservoir pressure which is not drawn upon in service, and on its lower side to auxiliary reservoir pressure. The spring 73 assists auxiliary reservoir pressure, and is so dimensioned as to yield only when auxiliary reservoir pressure falls 10 pounds below supplemental reservoir pressure. Thus as long as the triple valve remains in service position chamber 39 remains at atmospheric pressure and valve 42 remains in its lower service flow restricting position.

When the triple valve moves to preliminary lap or full lap position, chamber 39 is charged to brake pipe pressure, and this pressure acts beneath the diaphragm 47. Assisted by spring 58 it immediately shifts valve 42 upward to its free flow position. Consequently on an ensuing brake pipe reduction service flow will be at the full or free flow rate. Until the valve moves to lap position it will be at the restricted rate imposed by the passage 57. However, if auxiliary reservoir pressure falls a definite amount below supplemental reservoir pressure, the amount being determined by the spring 73 (and assumed to be 10 pounds) the diaphragm 67 will move downward and shift the bypass valve 62 to its lowermost position in which it connects ports 74 and 75 and establishes free flow irrespective of the action of the valve 42.

The operation of the various parts has already been described and the function of the valve in its different positions can therefore be very briefly traced.

*Release position.*—In release position the auxiliary reservoir and supplemental reservoir are charged from the brake pipe. The brake cylinder, quick service chamber 38, and the stabilizing chamber 39 are all exhausted. The quick service chamber and brake cylinder are exhausted through connection 37. It is important to note that brake cylinder flow is through port 82 and hence not controlled by valve 42. The stabilizing chamber is exhausted through the independent exhaust port 84.

*Quick service.*—As the spring 21 is relatively light, the triple valve only falters in quick service position. In this position the brake pipe is vented through ports 77, 88, cavity 91 and ports 89 and 78, into the measuring chamber. Service flow through ports 92 and 81 starts. The drop in brake pipe pressure, occasioned by quick service, then shifts the valve to quick full service position, Fig. 4.

*Full service.*—In full service position the port 92 is in full register with the port 81 and the ports 88 and 89 have moved to a throttling position so that quick service flow to the chamber 38 is retarded before full equalization between brake pipe and the service chamber 38 occurs. (The idea of graduating quick service flow by the slide valve is claimed in application Serial No. 517,606, filed February 21, 1931 and hence is not broadly claimed here.) Service flow starts through the port 81 in both these positions. When the port 81 leads to the ports 55 and 75 in the seats of valves 42 and 62, valve 42 is in its lowermost position because the stabilizing chamber 39 is at atmospheric pressure. The valve 62 is in its uppermost position, because auxiliary reservoir pressure is still within 10 pounds of supplemental reservoir pressure. Thus service flow must pass through the restricted extension 57 of valve 42 and this action continues as long as the triple valve remains in service position, or until valve 62 shifts.

*Preliminary lap position.*—On approach to equalization between auxiliary reservoir pressure and brake pipe pressure, occasioned by the reduction of auxiliary reservoir pressure as a result of flow to the brake cylinder, the light graduating spring 21 will shift the piston to preliminary lap position, Fig. 5. In this position service flow is restricted to the capacity of extension 93 and the brake pipe port 78 is connected through choke 96 and port 95 with the stabilizing chamber 39. Thus auxiliary reservoir pressure falls at a very slow rate and the stabilizing chamber absorbs air from the brake pipe, reducing the lap tendency and tending to dissipate wave energy in the brake pipe. The rise of pressure in the chamber 39 will gradually establish brake pipe pressure beneath the diaphragm 47, and at this time brake pipe pressure is approximately equal to auxiliary reservoir pressure which acts on the upper side of the diaphragm 47. Hence the spring 58 shifts the valve 42 to its upper or non-restricting position so that upon an ensuing brake pipe reduction service flow will be unrestricted.

*Full lap position.*—The gradual reduction of auxiliary reservoir pressure by flow to the brake cylinder, will establish a differential which will complete the lap movement of the valve. When this occurs the parts are in the position of Fig. 6, and all flow to the brake cylinder is terminated.

It will be observed that the shifting of the valve 42 is dependent on the development of pressure in the chamber 39 and this is dependent on lap motion of the triple valve. On short trains continuous service applications are made, i. e., applications in which the triple valve is not allowed to move to lap position. Under these conditions the valve 62 will respond to establish a free flow bypass around the valve 42 when auxiliary reservoir pressure acting beneath the diaphragm 67 has fallen a fixed amount, assumed to be 10 pounds, below supplemental reservoir pressure which is the same as the initial auxiliary reservoir pressure. This follows from the fact that the two reservoirs are charged concurrently, and only the auxiliary reservoir is drawn upon in service. Any volume so charged and not drawn upon in service might be used for this purpose, but it is desirable to use a supplemental reservoir capable of furnishing additional air in emergency.

*Emergency position.*—If the engineer makes an emergency reduction of brake pipe pressure, the triple piston moves until it seats against the gasket 16. On such motion it overpowers both graduating springs and the parts assume the position shown in Fig. 7.

In this position the emergency reservoir port is exposed and both emergency reservoir air and auxiliary reservoir air flow through the application port 92 to the brake cylinder port 82. It will be observed that the port 82 bypasses the valves 42 and 62 so that emergency flow is not restricted by these valves.

So far as the invention is concerned it is immaterial whether such flow be controlled by other means or not, and to simplify the illustration no emergency control mechanism is shown. Such mechanisms are common and their use is well understood, but it is to be remarked that since a separate path of flow is afforded in emergency there is nothing in the present disclosure to exclude such a device if its use is desired.

*General considerations.*—In describing this invention an effort has been made to simplify the disclosure. The drawings are diagrammatic to the extent that the ports are shown as if they all lay in a single plane. The object is to permit simultaneous flows to be traced. Features such as restricted recharge, restricted release, delayed emergency build-up, and many refinements which might be introduced in the design of the slide valve and graduating valve have been omitted without, however, implying that they are in any way incompatible with the invention here described. There are various different quick service mechanisms which are approximate equivalents of each other, and while a quick service vent making use of a measuring chamber has been chosen for illustration, no necessary limitation to this particular mechanism is implied. Other types are known, some of which repeat, that is, give quick service action on each brake valve initiated reduction of brake pipe pressure, and others of which, like that shown, do not repeat. It is obviously impracticable to illustrate all the variations which might be introduced in known components, but I wish expressly to note that except as stated in the claims no necessary limitation to the specific embodiment shown is implied.

What is claimed is:

1. The combination of a stabilizing chamber; and a triple valve including a brake pipe connection and having a release position in which it vents said chamber and a lap position in which it connects said brake pipe connection with said chamber.

2. The combination of a stabilizing chamber; and a triple valve including a brake pipe connection and having a release position in which it vents said chamber, a service position in which it isolates said chamber, and a lap position in which it connects said brake pipe with said chamber.

3. The combination of a stabilizing chamber; and a triple valve including a brake pipe connection and having a release position in which it vents said chamber, a service position in which it isolates said chamber, and a lap position in which it establishes a restricted communication from the brake pipe connection to said chamber, such as will retard, without stopping, the initial lapping motion of the triple valve, by reducing brake pipe pressure locally.

4. The combination of a stabilizing chamber; a triple valve, including a brake pipe connection, an auxiliary reservoir connection and a brake cylinder connection, and having a release position in which it vents said chamber, a service position in which it isolates said chamber, and a lap position in which it connects said brake pipe with said chamber; delay valve means controlling flow to the brake cylinder in service position; and means actuated at least in part by pressure in said chamber and arranged to shift said valve to restricting position when said chamber is uncharged and to non-restricting position when it is charged.

5. The combination of a stabilizing chamber; a triple valve, including a brake pipe connection, an auxiliary reservoir connection and a brake cylinder connection, and having a release position in which it vents said chamber, a service position in which it isolates said chamber, and a lap position in which it connects said brake pipe with said chamber; delay valve means controlling flow to the brake cylinder in service position; and means including an abutment subject to the opposing pressures in said chamber and in the auxiliary reservoir arranged to shift said valve to restricting position when said chamber is uncharged and to non-restricting position when it is charged.

6. The combination defined in claim 4 further characterized in that the triple valve has an emergency position in which it feeds air to the brake cylinder without passing through said delay valve.

7. The combination defined in claim 5 further characterized in that the triple valve has an emergency position in which it feeds air to the brake cylinder without passing through said delay valve.

8. The combination of a stabilizing chamber; and a triple valve including a brake pipe connection, an auxiliary reservoir connection, a brake cylinder connection and a yielding graduating stop, said triple valve having a release position in which it vents said chamber and the brake cylinder, a service position in which it isolates said chamber and admits auxiliary reservoir air to the brake cylinder, a preliminary lap position to which it is moved by said graduating stop and in which it restricts flow to the brake cylinder and permits restricted flow from the brake pipe to said chamber, and a lap position in which it arrests flow to the brake cylinder.

9. The combination of a stabilizing chamber; and a triple valve including a brake pipe connection, an auxiliary reservoir connection, a brake cylinder connection and a yielding graduating stop, said triple valve having a release position in which it vents said chamber and the brake cylinder, a service position in which it isolates said chamber and admits auxiliary reservoir air to the brake cylinder, a preliminary lap position to which it is moved by said graduating stop and in which it restricts flow to the brake cylinder and permits restricted flow from the brake pipe to said chamber, and a lap position in which it arrests flow to the brake cylinder and permits continued flow from the brake pipe to said chamber.

10. The combination of a stabilizing chamber; a triple valve including a brake pipe connection, an auxiliary reservoir connection, a brake cylinder connection and a yielding graduating stop, said triple valve having a release position in which it vents said chamber and the brake cylinder, a service position in which it isolates said chamber and admits auxiliary reservoir air to the brake cylinder, a preliminary lap position to which it is moved by said graduating stop and in which it restricts flow to the brake cylinder and permits restricted flow from the brake pipe to said chamber, and a lap position in which it arrests flow to the brake cylinder and permits continued flow from the brake pipe to said chamber; delay valve means controlling flow to the brake cylinder in service position; and means actuated at least in part by pressure in said chamber and arranged to shift said valve to restricting position when said chamber is uncharged and to non-restricting position when it is charged.

11. The combination of a stabilizing chamber; a triple valve including a brake pipe connection, an auxiliary reservoir connection, a brake cylinder connection and a yielding graduating stop, said triple valve having a release position in which it vents said chamber and the brake cylinder, a service position in which it isolates said chamber and admits auxiliary reservoir air to the brake cylinder, a preliminary lap position to which it is moved by said graduating stop and in which it restricts flow to the brake cylinder and permits restricted flow from the brake pipe to said chamber, and a lap position in which it arrests flow to the brake cylinder and permits continued flow from the brake pipe to said chamber; delay valve means controlling flow to the brake cylinder in service position; and means including an abutment subject to the opposing pressures in said chamber and in the auxiliary reservoir, arranged to shift said valve to restricting position when said chamber is uncharged and to non-restricting position when it is charged.

12. The combination of a stabilizing chamber; a triple valve, including a brake pipe connection, an auxiliary reservoir connection and a brake cylinder connection, and having a release position in which it vents said chamber, a service position, and a lap position in which it connects said brake pipe with said chamber; delay valve means controlling flow to the brake cylinder in service position; means actuated at least in part by pressure in said chamber and arranged to shift said valve to restricting position when said chamber is uncharged and to non-restricting position when it is charged; and means responsive to a definite reduction of auxiliary reservoir pressure to suspend the restricting action of said delay valve.

13. The combination of a stabilizing chamber; a triple valve, including a brake pipe connection, an auxiliary reservoir connection and a brake cylinder connection, and having a release position in which it vents said chamber, a service position in which it isolates said chamber, and a lap position in which it connects said brake pipe with said chamber; delay valve means controlling flow to the brake cylinder in service position; means including an abutment subject to the opposing pressures in said chamber and in the auxiliary reservoir arranged to shift said valve to restricting position when said chamber is uncharged and to non-restricting position when it is charged; and means responsive to a definite reduction of auxiliary reservoir pressure to suspend the restricting action of said delay valve.

14. The combination of a stabilizing chamber; a triple valve including a brake pipe connection, an auxiliary reservoir connection, a brake cylinder connection and a yielding graduating stop, said triple valve having a release position in which it vents said chamber and the brake cylinder, a service position in which it isolates said chamber and admits auxiliary reservoir air to the brake cylinder, a preliminary lap position to which it is moved by said graduating stop and in which it restricts flow to the brake cylinder and permits restricted flow from the brake pipe to said chamber, and a lap position in which it arrests flow to the brake cylinder and permits continued flow from the brake pipe to said chamber; delay valve means controlling flow to the brake cylinder in service position; means actuated at least in part by pressure in said chamber and arranged to shift said valve to restricting position when chamber is uncharged and to non-restricting position when it is charged; and means responsive to a definite reduction of auxiliary reservoir pressure to suspend the restricting action of said delay valve.

15. The combination of a stabilizing chamber; a triple valve including a brake pipe connection, an auxiliary reservoir connection, a brake cylinder connection and a yielding graduating stop, said triple valve having a release position in which it vents said chamber and the brake cylinder, a service position in which it isolates said chamber and admits auxiliary reservoir air to the brake cylinder, a preliminary lap position to which it is moved by said graduating stop and in which it restricts flow to the brake cylinder and permits restricted flow from the brake pipe to said chamber, and a lap position in which it arrests flow to the brake cylinder and permits continued flow from the brake pipe to said chamber; delay valve means controlling flow to the brake cylinder in service position; means including an abutment subject to the opposing pressures in said chamber and in the auxiliary reservoir, arranged to shift said valve to restricting position when said chamber is uncharged and to non-restricting position when it is charged; and means responsive to a definite reduction of auxiliary reservoir pressure to suspend the restricting action of said delay valve.

16. The combination of a stabilizing chamber; a triple valve, including a brake pipe connection, an auxiliary and a supplemental reservoir connection and a brake cylinder connection, said triple valve having a release position in which it vents said chamber, a service position and a lap position in which it connects said brake pipe with said chamber; delay valve means controlling flow to the brake cylinder in service position; yielding means urging said delay valve means toward flow restricting position; and two means for suspending the delaying action thereof, one responsive to the establishment of pressure in said chamber and the other responsive to diminution of auxiliary reservoir pressure relatively to supplemental reservoir pressure.

17. The combination of a stabilizing chamber; a triple valve including a brake pipe connection, an auxiliary and a supplemental reservoir connection and a brake cylinder connection, said triple valve having a release position in which it vents said chamber, a service position and a lap position in which it connects said brake pipe with said chamber; two valves arranged in parallel to control flow to the brake cylinder in service, one valve having a non-restricting and a restricting position and the other a non-restricting and a flow interrupting position; yielding means urging said valves away from their non-restricting positions; means operable by the establishment of pressure in said chamber to shift the first valve to non-restricting position; and means operable by a definite preponderance of supplemental over auxiliary reservoir pressure to shift the second valve to non-restricting position.

18. The combination of claim 16 further characterized in that said triple valve has an emergency position in which it connects both said reservoirs with said brake cylinder independently of said delay valve means.

19. The combination of claim 17 further characterized in that said triple valve has an emergency position in which it connects both said reservoirs with said brake cylinder independently of said two valves.

20. The combination of a stabilizing chamber; a triple valve including a brake pipe connection, an auxiliary and a supplemental reservoir connection and a brake cylinder connection, said triple valve having a release position in which it vents said chamber, a service position in which it isolates said chamber and a lap position in which it connects said brake pipe with said chamber; two valves arranged in parallel to control flow to the brake cylinder in service, one valve having a non-restricting and a restricting position and the other a non-restricting and a flow interrupting position; yielding means urging said valves away from their non-restricting positions; an abutment connected with the first of said two valves and subject to opposing chamber and auxiliary reservoir pressures; and an abutment connected with the second of said two valves and subject to opposing auxiliary reservoir and supplemental reservoir pressures, auxiliary reservoir pressure opposing said yielding means on the first abutment and assisting said yielding means on the second abutment.

21. The combination of a triple valve including a brake cylinder connection and having a service position and a lap position; means normally active to restrict flow to said brake cylinder connection in service position; and means rendered effective by motion of the triple valve to service and thence to lap position to suspend the action of said flow restricting means.

22. The combination of a triple valve including a brake cylinder connection and having a release position, a service position and a lap position; means normally active to restrict flow to said brake cylinder connection in service; means rendered effective by motion of the triple valve to service and thence to lap position to suspend the action of said flow restricting means; and means rendered effective by motion of the triple valve to release position to restore the action of said flow restricting means.

23. The combination of a triple valve including a brake cylinder connection and having a service position and a lap position; means normally active to restrict flow to said brake cylinder connection in service position; means rendered effective by motion of the triple valve to service and thence to lap position to suspend the action of said flow restricting means; and independent means rendered effective by the production of a substantial service application to suspend the action of the flow restricting means.

24. The combination of a triple valve including a brake cylinder connection and having a service position and a lap position; means normally active to restrict flow to said brake cylinder connection in service position; means rendered effective by motion of the triple valve to service and thence to lap position to suspend the action of said flow restricting means; and means rendered effective by a definite reduction of auxiliary reservoir pressure to suspend the action of said flow restricting means.

25. The combination of a triple valve including a brake cylinder connection and having a service position and a lap position; means normally active to restrict flow to said brake cylinder connection in service position; means rendered effective by motion of the triple valve to service and thence to lap position to suspend the action of said flow restricting means; independent means rendered effective by the production of a substantial service application to suspend the action of the flow restricting means; and means rendered effective by motion of the triple valve to release position to restore the action of said flow restricting means.

26. The combination of a stabilizing chamber; a triple valve including a brake pipe connection, an auxiliary reservoir connection and a brake cylinder connection, said triple valve having a brake cylinder exhaust port and a brake cylinder service port distinct from each other, and having a release position in which it vents said chamber and connects said brake cylinder exhaust port to an exhaust passage, a service position in which it isolates said chamber and disconnects said exhaust port, and a lap position in which it connects the brake pipe with said chamber; delay valve means controlling flow to the brake cylinder through said service port; and means actuated at least in part by pressure in said chamber and arranged to shift said valve to restricting position when said chamber is uncharged and to non-restricting position when it is charged.

27. The combination of a triple valve including a brake pipe connection, an auxiliary reservoir connection and a brake cylinder connection, said triple valve having a brake cylinder port through which flow occurs in release and in emergency, and a distinct brake cylinder port through which flow occurs in service; and pressure actuated valve means for controlling the rate of flow through said service port.

28. The combination of a triple valve adapted for connection with brake pipe, brake cylinder and auxiliary reservoir, said valve being shiftable between a plurality of positions including an application position and a lap position, and means comprising ports in said valve for venting a limited quantity of brake pipe air as the triple valve approaches lap position by motion from said application position.

29. The combination of a triple valve adapted for connection with brake pipe, brake cylinder and auxiliary reservoir, said valve being shiftable between a plurality of positions including an application position and a lap position, a normally vented measuring chamber, and means rendered effective by approach of the triple valve to lap position from said application position, for connecting said chamber with the brake pipe.

30. The combination of an automatic brake valve for use in conjunction with a brake cylinder, reservoir and brake pipe, said automatic valve comprising a valve having an application position and a lap position, and a piston for actuating said valve, said piston moving in response to the pressure differential between the brake pipe and reservoir; and means operative as said piston moves said valve from application position to lap position to vent a limited quantity of air from the brake pipe.

CHARLES A. CAMPBELL.